May 10, 1927.  
H. H. KESSLER  
1,628,629  
CLUTCH MECHANISM  
Filed March 5, 1926
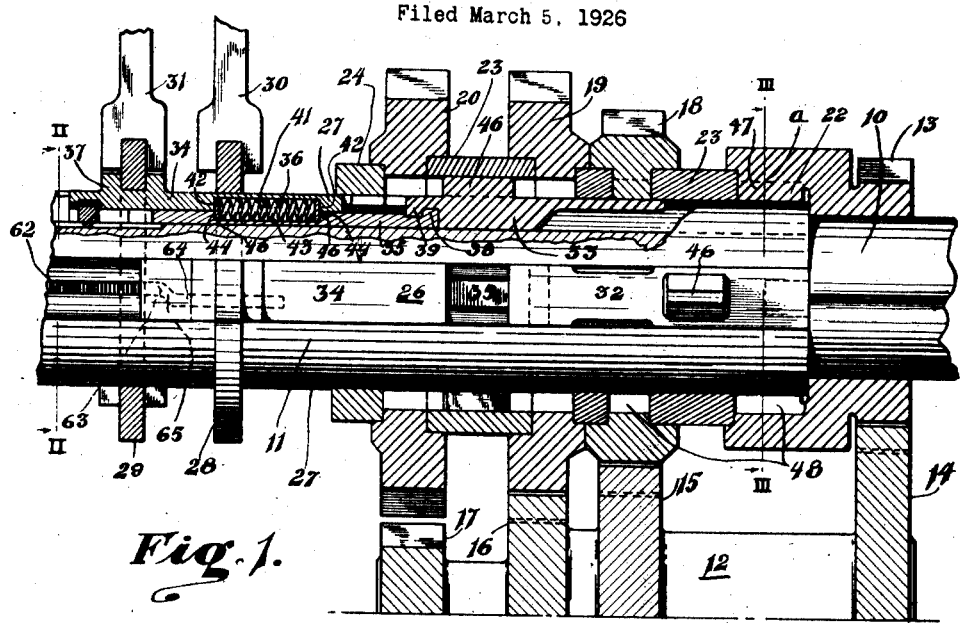
H. H. Kessler
INVENTOR
WITNESSES:
BY A. B. Reavis
ATTORNEY Patented May 10, 1927.

1,628,629

UNITED STATES PATENT OFFICE.

HARRY H. KESSLER, OF BETHLEHEM, PENNSYLVANIA.

CLUTCH MECHANISM.

Application filed March 5, 1926. Serial No. 92,396.

My invention relates to shiftable key mechanism for coupling gears and the like to shafts and it has for an object to provide apparatus of this character wherein it is assured that at least one key is at all times capable of being shifted to engage between projections of a gear or the like to couple the latter to its shaft.

One of the difficulties experienced in the past with slidable key gearing has been that of abutting of the keys with gear projections, thereby making clutching of the gears to their shafts difficult as well as resulting in injury to the clutching or keying devices. Accordingly, therefore, it is an object of my invention to provide slidable key gearing wherein the projections and keys are disposed in odd-even relationship, or, stated in another way, the number of keys of a set is not divisible into the number of cooperative projections, whereby at least one key of a set is at all times capable of entering a space between projections.

A further object of my invention is to provide a set of movable keys wherein each key includes yieldable means in order that, should a key abut a projection, shifting of the set will not be interfered with and the key or keys registering with spaces between projections will enter such spaces while the abutting key will have energy stored in its spring means, the stored energy being effective to snap the key into place between projections as soon as this is possible.

A further object of my invention is to provide key devices each of which includes primary and secondary members with spring means therebetween so that, should a key device abut a gear projection, the spring means will be compressed, and, upon the secondary member of the device passing out of abutting relation with a projection, the spring means will be effective to snap the driven member into a space between projections.

A further object of my invention is to provide a key device of the character just referred to having latching mechanism for latching the primary and secondary members together upon initiation of movements of the device from engaged to disengaged positions.

A further object of my invention is to provide a set of slidable key devices, which are yieldable and which are so related to projections of a gear or the like that they engage both driving and non-driving faces of the projections, whereby backlash is minimized.

These and other objects are effected by my invention as will appear from the following description and claims taken in connection with the accompanying drawings, forming a part of this application, in which:

Fig. 1 is a view partly in elevation and partly in section of gearing showing my improvement applied thereto;

Fig. 2 is a sectional view taken along the line II—II of Fig. 1, viewed in the direction of the arrows, and showing one of the shift yokes in elevation;

Fig. 3 is a sectional view of the driving and driven members taken along the line III—III of Fig. 1 and showing the keys in engaged position;

Figs. 4, 5, and 6 are fragmentary detail sectional views of the key construction, Figs. 5 and 6 being taken along the lines V—V and VI—VI, respectively, of Fig. 4 and viewed in the directions of the indicating arrows.

Referring to the drawings more in detail, I show alined driving and driven shafts 10 and 11 and a countershaft and gear unit, at 12, the latter being driven from the driving shaft 10 by the meshing gears 13 and 14. The countershaft gear unit, at 12, is provided with gears 15, 16, and 17 of different sizes, the gear 15 meshing with the gear 18 on the driven shaft and constituting the intermediate ratio, the gear 16 meshing with the gear 19 on the driven shaft and constituting the low ratio, and the gear 17 driving the gear 20 on the driven shaft through the intermediary of an idler for reverse. A member 22, preferably unitary with the gear 13, is connected to the driving shaft 10 and telescopes over the driven shaft 11 and it constitutes a coupling member through which high-speed ratio may be secured. Two sets of key devices are provided in order that the coupling member and the gears 18, 19, and 20 may be selectively connected to the driven shaft 11, one set of key devices having a neutral position between the coupling member 22 and the gear 18 and shiftable therefrom to engage either and the other set of key devices having a neutral position between the gears 19 and 20 and shiftable therefrom to engage either of the latter gears.

Bearing rings 23 and 24 are secured to the driven shaft 11 and they serve not only to afford bearings for the coupling member 22 and the gears 18, 19, and 20 but also to maintain the proper spacial relationship of these parts.

I show two sets of key devices 26 and 27 slidable longitudinally of the driven shaft 11, the key devices preferably fitting in concave grooves provided in the shaft. The set of key devices 26 is arranged for cooperation with the coupling member 22 and the gear 18 and the other set of key devices is arranged for cooperation with the gears 19 and 20. The key devices 26 and 27 are preferably engaged by rings 28 and 29 fitting yokes 30 and 31 carried by shift rods of a conventional type in order that the key devices may be shifted. The key devices 26 and 27 are similar except that the key portions 32 of the key devices 26 are longer than the key portions 33 of the key devices 27; hence, the description of one of these devices in detail will suffice for an understanding of my invention.

Referring to Figs. 1 and 4, it will be seen that each of the key devices 26 and 27 includes a primary member 34 and a secondary member 35 connected by a spring 36 preferably arranged under a suitable degree of initial tension. The primary members have spaced lugs 37 between which the rings 28 and 29 fit and the secondary members 35 have coupling portions 38 engaging coupling portions 39 of the key portions 32 and 33. In this way, it is possible to have key devices which are interchangeable, it only being necessary to provide key portions 32 and 33 of suitable lengths.

The primary member 34 is provided with a longitudinal recess 41 for the spring 36, abutments 42 being arranged at the ends of the recess for cooperation with the ends of the spring so that a predetermined normal compression may be maintained in the latter. The secondary member 35 is preferably recessed at 43 to fit over the spring and it is provided with abutments 44 for cooperation with the ends of the spring, the abutments 42 and 44 constituting complementary parts of end walls for the spring chamber formed by the mating recesses 41 and 43. Disks 46 are preferably arranged between the ends of the spring 36 and the abutments 42 and 44. It will, therefore, be seen that the primary member 34 is capable of transmitting motion, through the spring 36, to the secondary member 35 in either direction and that if motion of the secondary member 35 is arrested the primary member 34 may continue to move with storage of energy in the spring.

The key devices 26 are equi-distantly spaced angularly of the driven shaft 11, and the same is true of the key devices 27, the latter being interposed between the former.

The key portions 32 and 33 have key parts 46, preferably of wedge-shaped or outwardly tapering form, for cooperation with projections 47 of similar form on the coupling member 22 and the gears 18, 19, and 20. The projections 47 are also angularly equi-distantly spaced. The working faces of the key parts 46 and of the projections 47 extend parallel to the shaft axis. In order that at least one key part 46 of either set of key devices may enter spaces between projections 47 on the associated members, I have the projections 47 separated by fairly wide arcuate spaces 48 and the key parts 46 and the projections 47 are disposed in odd-even relationship, that is, the number of key parts 46 of a key set is not divisible into the number of projections 47 on a member or gear. For example, I show each set of key devices having diametrically opposed key parts 46 and the coupling member 22 and the gears 18, 19, and 20 are each provided with five projections 47. It will, therefore, be apparent that, irrespective of the angular position of the coupling member or of any of the gears 18, 19, and 20, relative to the driven shaft 11, at least one of the key parts 46 of each set is at all times opposite to a space 48 between projections 47 of an associated part to be coupled.

From the structure described, it will be apparent that the sets of key devices 26 and 27 may be selectively shifted in either direction. If the adjacent end of a key-part 46 should abut a projection 47, the diametrically-opposed key device will be opposite a space 48 between projections, and continued movement of the associated shift yoke in the same direction would result in movement of the primary member 34 of the key device, whose key part abuts a projection 47, with storage of energy in its spring 36 and it would result in the key part 46 of the other key device of the set entering the opposed arcuate space 48. Due to relative angular movement taking place between the driven shaft 11 and the member to be coupled thereto, a key part 46 enters a space 48, one of the faces of one of the projections 47 moves to engage the opposed face of the key so that, with the arrangement shown, power is transmitted from a projection 47 to a key part 46 and thence to the driven shaft 11. Upon engagement of the entering key part 46 by a projection 47, the key part 46 of the diametrically opposed key device of the set will then be in a position to enter a space and it does so under the influence of the energy stored in the spring. From the foregoing, it will be apparent that the key devices 26 are adapted to move only in rectilinear paths in order to be engaged and disengaged from the part to be connected to the shaft.

Upon reference to Fig. 3, it will be seen that, for a given direction of rotation, only one pair of engaging projection and key part faces constitutes a power-transmitting pair, the other pair of engaging faces serving to limit backlash.

While yieldableness of the key devices is essential to the mode of engagement decribed, it is desirable that the primary and secondary members 34 and 35 of the key devices shall be positively connected when the key devices are moved from engaged to neutral position, thereby avoiding the possibility of a key part 46 sticking and the associated spring 36 yielding. To this end, I show the primary member 34 having the latch part 51 pivoted thereto by means of a pivot pin 52, the latch part having a depending latch portion 53, preferably rectangular in cross-section, which cooperates with a latching portion 54 on the secondary member 35 of a key device. The latching portion 54 preferably takes the form of a slot extending longitudinally of the secondary member 35 at one end of the latter and having an off-set portion 55 providing transverse abutment faces 56 and 57 for cooperation with end faces 58 and 59, respectively, of the depending latch portion 53. Below the latching portion 53, the latch part 51 is provided with a cam follower portion 61, which fits in a cam groove 62 at the bottom of the groove in the driven shaft 11 for the associated key device. The cam groove has portions 63 and 64 in off-set relation connected by an inclined portion 65, the portions 63 and 64 extending longitudinally of the driven shaft. When a key device is in neutral position, the cam follower portion 61 of its latching part 51 is in the inclined portion 65 of the cam groove and the latching portion 53 is disposed substantially midway of the length of the off-set portion 55 of the secondary member 35 with the end faces 58 and 59 spaced suitably from the abutment faces 56 and 57, respectively. Immediately as shifting of the primary member 34 begins, its latching part is swung about its pivot due to the follower portion 61 and the inclined portion 65 of the cam groove so that the forward end face of the depending latch portion 53 will not engage a transverse abutment face of the off-set portion 55 during shifting to engaged position, whereby the key device is fully yieldable when shifted in this direction, and so that, upon shifting from engaged position to neutral, one of the off-set portions 63 or 64 of the cam groove will confine the latch part to such a path of motion that the forward end face of depending latch portion 53 will be forced to positively engage a transverse abutment face of the off-set portion 55, whereby the primary member 34 is positively connected to the secondary member 35 for pulling the latter out of engaged position to neutral and the associated spring 36 is rendered ineffective during this movement.

While I have shown my invention applied to multiple-ratio gearing and while I show key devices of the axially movable type, it will be obvious to those skilled in the art that my invention is not so limited but that it may be applied in various ways coming within the scope of the appended claims.

What I claim is:

1. In apparatus of the class described, the combination of a rotatable shaft, a member co-axially related to said shaft and having spaced projections provided with working faces extending substantially parallel to the shaft axis, a plurality of independent yieldable key devices having key portions provided with working faces extending substantially parallel to the shaft axis, said key devices being mounted on the shaft and movable relatively thereto to engage in the spaces between projections and said key devices and projections being disposed in odd-even relationship, whereby, a key device may at all times be moved into a space between projections, and means for shifting the key devices with respect to the shaft.

2. In apparatus of the class described, the combination of a rotatable shaft, a member co-axially related to said shaft and having projections separated by spaces, a set of yieldable key devices carried by the shaft and movable relatively to the latter to engage in the spaces between projections, said keys and projections being disposed in odd-even relationship, whereby a key of the set may at all times be moved into a space between projections, means for shifting the key set relatively to the shaft, and means for rendering the yieldable means of the key devices ineffective during movement thereof to neutral, whereby positive disengagement of the key devices from the projections is assured.

3. In apparatus of the class described, the combination of a rotatable shaft, a member co-axially related to said shaft and having spaced projections provided with working faces arranged substantially parallel to the shaft axis, a plurality of independent key devices carried by the shaft and movable relatively thereto to engage in the spaces between the projections, each of said key devices including primary and secondary members with yieldable means interposed between the members and the secondary members having working faces arranged substantially parallel to the shaft axis, and means for shifting the primary members relatively to the shaft.

4. In apparatus of the class described, the combination of a rotatable shaft, a member co-axially related to said shaft and having equi-distantly angularly spaced projections separated by arcuate spaces materially wider than the maximum width of the projections, separate key devices carried by the shaft and movable rectilinearly with respect thereto to engage in the spaces between projections, each of said key devices including primary and secondary members and spring means for transmitting motion from the primary to the secondary members, and a shifting member connected to the primary members of the key devices.

5. In apparatus of the class described, the combination of a rotatable shaft, a member co-axially related to said shaft and having internal projections equi-distantly spaced angularly and separated by arcuate spaces materially wider than the maximum width of the projections, separate key devices carried by the shaft and movable longitudinally thereof to engage in the spaces between the projections, each of said key devices including primary and secondary members with a double-acting compression spring interposed between the members so that the secondary member may be actuated through the spring by the primary member in either direction, and means for shifting the key devices longitudinally of the shaft.

6. In apparatus of the class described, the combination of a rotatable shaft, a member co-axially related to said shaft and having projections equi-distantly spaced angularly, said projections being separated by arcuate spaces materially wider than the maximum width of the projections, separate key devices carried by the shaft and movable longitudinally thereof to engage in the spaces between the projections, each of said key devices including primary and secondary members with double-acting yieldable means interposed between the members, whereby the primary member may transmit motion to the secondary member in either direction through the spring means, means for shifting the key devices, and means for positively connecting the primary and secondary members of the key devices together upon disengagement of the key devices from the projections.

7. In apparatus of the class described, the combination of a rotatable shaft, a member coaxially related to said shaft and having projections equi-distantly spaced angularly and separated by arcuate spaces materially wider than the maximum width of the projections, separate key devices carried by the shaft and movable relatively thereto to engage in the spaces between projections, each of said key devices including primary and secondary members having spaced abutments and the abutments of the secondary member being capable of longitudinal movement past the abutments of the primary member, a spring under compression between the abutments of the members, and means for shifting the key devices relatively to the shaft.

8. In apparatus of the class described, the combination of a rotatable shaft, a member co-axially related to said shaft and having equi-distantly spaced projections extending toward the shaft and the projections being separated by arcuate spaces materially wider than the maximum width of the projections, separate key devices carried by the shaft and movable longitudinally thereof to engage in the spaces between the projections, each of said key devices including primary and second members with yieldable means interposed between the members so that motion is transmitted in either direction from the primary member to the secondary member through the yieldable means, latch mechanism including fixed and movable means carried by the respective members of each key device, means on the shaft and cooperating with the movable means of the latch mechanism to secure latching together of the primary and secondary members upon disengaging movement of the key devices, and means for shifting the key devices longitudinally of the shaft.

9. In apparatus of the class described, the combination of a rotatable shaft, a member co-axially related to said shaft and having projections equi-distantly spaced angularly and separated by arcuate spaces materially wider than the maximum width of the projections, a plurality of independent yieldable key structures carried by the shaft and shiftable with respect to the latter, said key structures being adapted to engage driving and non-driving faces of said projections, whereby backlash between the key structures and the projections is substantially eliminated, and means for shifting the key structures with respect to the shaft.

10. In apparatus of the class described, the combination of a rotatable shaft, a member co-axially related to said shaft and having equi-distantly spaced projections separated by arcuate spaces materially wider than the maximum width of said projections, a plurality of separate yieldable keys carried by the shaft and movable only rectilinearly relatively thereto to engage in spaces between projections, the number of said projections being not divisible by the number of said keys in order that a key may enter a space between projections at all times, and means for shifting the keys relatively to the shaft.

11. In apparatus of the class described, the combination of a rotatable shaft, a member co-axially related to said shaft and having an odd number of equi-distantly spaced projections separated by arcuate spaces materially wider than the maximum width of said projections, a pair of diametrically opposed, independent and yieldable keys carried by the shaft and movable only rectilinearly relatively thereto to engage in the spaces between projections, and means for shifting the keys relatively to the shaft.

12. In apparatus of the class described, the combination of a rotatable shaft, a member co-axially related to said shaft and having an odd number of equi-distantly spaced internal projections separated by arcuate spaces materially wider than the maximum width of said projections, a pair of diametrically opposed, independent and longitudinally yieldable keys carried by the shaft and movable only rectilinearly to engage in the spaces between projections, and means for shifting the keys with respect to the shaft.

Signed at Bethlehem in the county of Northampton and State of Pennsylvania, this 25th day of February, 1926.

HARRY H. KESSLER.